(12) United States Patent
Steeves

(10) Patent No.: US 7,653,720 B1
(45) Date of Patent: Jan. 26, 2010

(54) PROPAGATION OF INFORMATION ON AN INDEXED ADDRESSED NETWORK

(75) Inventor: David John Steeves, Moncton (CA)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 10/792,254

(22) Filed: Mar. 3, 2004

(51) Int. Cl.
G06F 15/173 (2006.01)
(52) U.S. Cl. ............... 709/224; 713/150; 370/250
(58) Field of Classification Search ............ 709/224
See application file for complete search history.

(56) References Cited

U.S. PATENT DOCUMENTS 5,377,207 A * 12/1994 Perlman ............... 714/784

OTHER PUBLICATIONS

Weaver et al. A Taxonomy of Computer Worms. Oct. 27, 2003.*
Staniford et al. Top Speed of Flash Worms. Oct. 29, 2004.*
Ma et al. Self-Stopping Worms. Nov. 11, 2005.*
Salomon, David. Foundations of Computer Security—Worms. Mar. 20, 2006. Springer London.*
Laplante, Phillip A. Dictionary of Computer Science, Engineering, and Technology. CRC P LLC, 2001.*
Bristow, S., "GIAC GSEC: Practical Assignment for SANS GSEC Version 1.2E Code Red Worm Invasion," *SANS Institute*, 2001, 1-11.
Koblitz, N., "A Course in Number Theory and Cryptography," Second Edition, Graduate Texts in Mathematics, Springer, 1994, pp. 33-37.
Martin, M.V., "Overview of Worms and Defence Strategies," Oct. 21, 2003, 1-29.
Vogt, T., "Simulating and Optimising Worm Propagation Algorithms," Sep. 29, 2003, 1-32.
Weaver, N.C., "Warhol Worms: The Potential for Very Fast Internet Plagues," http://www.cs.berkeley.edu/~nweaver/warhol.html, 2001, 9 pages.
Zou, C.C. et al., "Code Red Worm Propagation Modeling and Analysis," *Proceedings of the 9th ACM Conference on Computer and Communications Security*, Washington, D.C., Nov. 18-22, 2002, 10 pages.
Zou, C.C. et al., "Monitoring and Early Warning for Internet Worms," *Proceedings of the 10th ACM Conference on Computer and Communications Security*, Washington, D.C., Oct. 27-30, 2003, 10 pages.

* cited by examiner

Primary Examiner—Vivek Srivastava
Assistant Examiner—Vivek Krishnan
(74) Attorney, Agent, or Firm—Woodcock Washburn LLP

(57) ABSTRACT

A system and method to propagate data over a network such as the Internet. The system and method determine a first set of addresses and perform a function such as a primitive element exponentiation upon those addresses to map to a second address space. The second address space could be a pseudo random ordering of addresses in the first address space such that each address in the first address space maps to an address in the second address space. The second address space is traversed to deliver data to receptive elements on the network. Each receptive element on the network is enlisted to continue propagating the data across the network resulting in a one-to-one, pseudo-random, exponential propagation.

27 Claims, 8 Drawing Sheets

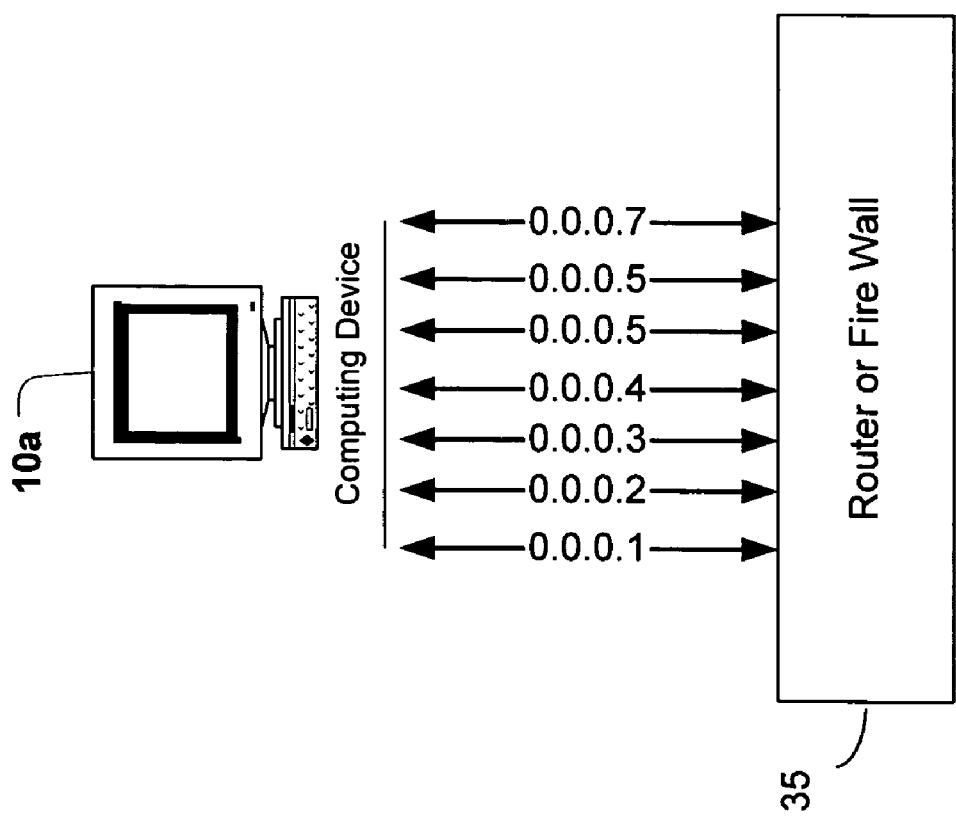

PROPAGATION OF INFORMATION ON AN INDEXED ADDRESSED NETWORK

FIELD OF THE INVENTION

The present invention relates generally to the field of computing. More particularly, the invention relates to a system and method for propagating information on a network.

BACKGROUND OF THE INVENTION

The Internet address space is a set of globally (world-wide) unique numbers. Addresses are assigned to various networks, to ensure that no two networks attempt to use the same network address in the Internet. The address assignment is provided by a registration service referred to as Regional Internet Registries that track IP address allocation. Users normally refer to specific computing devices and services on the internet using "names," (e.g., www.microsoft.com) as opposed to numbers. But when computers make network connections these names are immediately translated to numeric IP addresses, which are used in connecting to the desired computing device or service.

The traditional numeric IP address (also called IPv4, standing for IP version 4) is a 32-bit number that uniquely identifies a network interface on a host. A host typically has one network interface and consequently one IP address, although sometimes it is equipped with multiple network interfaces. Because of the 32-bit limitation, the IPv4 address space is capable of addressing a theoretical maximum of 4,294,967,296 ($2^{32}$) distinct IP numbers (hosts). The IP addresses are commonly written in "dot notation", as four decimal numbers, separated by dots, e.g. 209.92.56.2. Each number can have a maximum value of 255. Hence, IP address space is from 0.0.0.0 to 255.255.255.255.

The IP has the addressing structure, which developed as a two-level hierarchy in both addressing and routing. One part of the address, the network part, identifies the particular network a host is connected to, while the other part, the local part, identifies the particular end host on that network. Internet routing, then, has to deal only with the network part of the address, routing the packet to a router directly connected to the destination network. The local part is not used at all in Internet routing itself; rather it is used to determine the intended host on the destination network. An organization can use some of the bits in the host part of the address to identify a specific subnet. Effectively, the IP address then contains three parts: the network number, the subnet number, and the machine number.

IP addresses can be one of several classes, each determining how many bits represent the network number and how many represent the host number. The most common class used by large organizations (Class B) allows 16 bits for the network number and 16 for the host number. Using the above example, here's how the IP address is divided:

<--Network address--> <--Host address-->

209.92    .    56.2

To add subnetting to this address, some portion (in this example, eight bits) of the host address could be used for a subnet address. Thus:

<--Network address--> <--Subnet address--> <--Host address-->

209.92    .    56    .    2

In other words, the subnet is divided into eight bits but an organization could choose some other scheme using only part of the third quad or even part of the fourth quad.

A subnet (short for "subnetwork") is an identifiably separate part of an organization's network. Typically, a subnet may represent all the machines at one geographic location, in one building, or on the same local area network (LAN). Having an organization's network divided into subnets allows it to be connected to the Internet with a single shared network address. Without subnets, an organization could get multiple connections to the Internet, one for each of its physically separate subnetworks, but this would require an unnecessary use of the limited number of network numbers the Internet has to assign. It would also require that Internet routing tables on gateways outside the organization would need to know about and have to manage routing that could and should be handled within an organization.

The ubiquity of the Internet has spawned a variety of attacks that attempt to provide a payload of malicious code to a significant percentage of computing devices connected to the Internet. Because of the number of computing devices connected to the Internet (e.g., $2^{32}$ for IPv4 and $2^{64}$ for IPv6) propagation of the payload is an obstacle to the spread of the malicious code during an attack. Several propagation algorithms have surfaced that provide for rapid propagation. For example, a typical propagation technique scans through the IP address space sequentially, i.e., starting at 0.0.0.0 and ending at 255.255.255.255. The scanning program usually looks for active network connected computing devices by sending a message to an arbitrary IP address and listening for a response.

Typically, scanning is done by dividing the IP address space of interest (e.g., the entire IPv4 address space) among a number of computing devices, each of which will start at the beginning of its assigned IP address space and scan for a computing device that responds to an inquiry. After a connected, responsive computing device is found, that computing device will be provided with a payload. The payload usually enlists the newly infected computing device to join the scanning within an assigned address space, which is a subset of the address space assigned to the infecting machine.

Some such scanning techniques use a form of a binary tree. With each computing device, dividing its assigned address space into two parts. Each part is scanned until a computing device is found and provided with the payload. The newly infected machines repeat the process until the entire IP address space has been scanned.

Other techniques for propagating address space employ a hit list. Using such that techniques, a block of address space is forwarded to a computing device, which then divides the hit list and passes portions on to found computing devices. This allows a complete randomization of the address space, but also requires a large file to be transmitted over the network.

The subject invention addresses the drawbacks of the scanning and hit list techniques for propagating a payload through a network.

SUMMARY OF THE INVENTION

Systems and methods according to the subject invention propagate data over a network. The systems and methods start with a sequential first set of network addresses, such as the address spaces in a private network, a subnet, or the Internet. From that sequential first set of address spaces, the systems and methods map the range of addresses to a second set of addresses wherein the second set of addresses is a one to one mapping of the address from the first set and wherein the addresses in the second set are not in increasing address order.

The systems and methods traverse the second set of addresses to find elements of the network that a receptive to receive a payload. After a receptive element is found, data such as the propagation algorithm and a payload are transferred to the element of the network and with an indication of at least a portion of the addresses remaining in the second set.

At least two such network elements are found and the propagation algorithm and payload is transferred to each. They in turn repeat the process until each element of the network that is receptive has received the payload.

Preferably, the mapping is a function based on a primitive element.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 3A and 3B illustrate an example of a technique for propagating information on an IP address space using a scanning technique;

DETAILED DESCRIPTION OF ILLUSTRATIVE EMBODIMENTS

Figure 1:
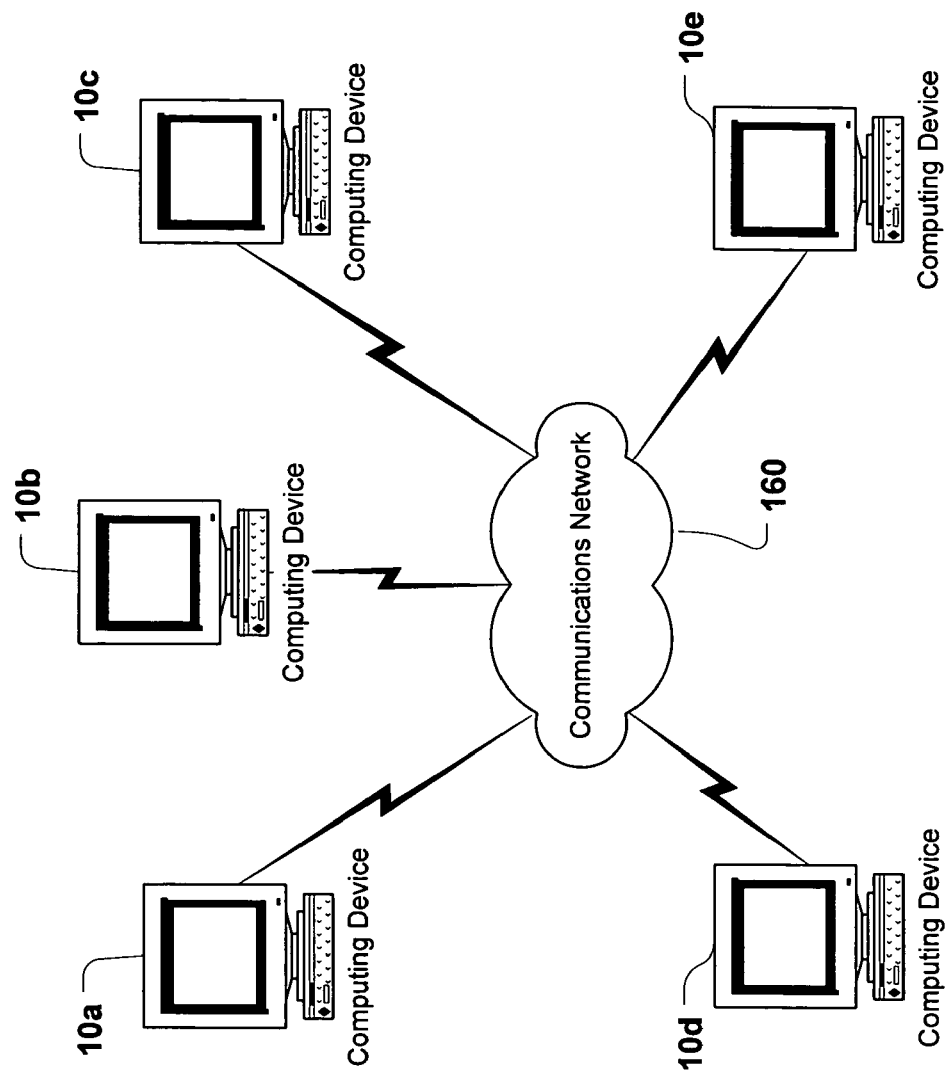
FIG. 1 is an example of a computer network wherein aspects of the present invention may be employed.

FIG. 1 is diagram of an exemplary computer network that serves to illustrate aspects of the invention. Here computers 10a-10e may host various ones of the objects of FIG. 1. Although the physical environment shows the connected devices as computers, such illustration is merely exemplary and may comprise various digital devices such as PDAs, televisions, MP3 players, etc. Moreover, communications network 160 may itself comprise a number of computers and network devices such as routers and the like.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The Internet commonly refers to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections.

Additionally, the computer network may comprises a distributed computing environment. In such an environment a computing task may be spread over a number of computing devices that are addressable elements in a computer network.

Figure 2:
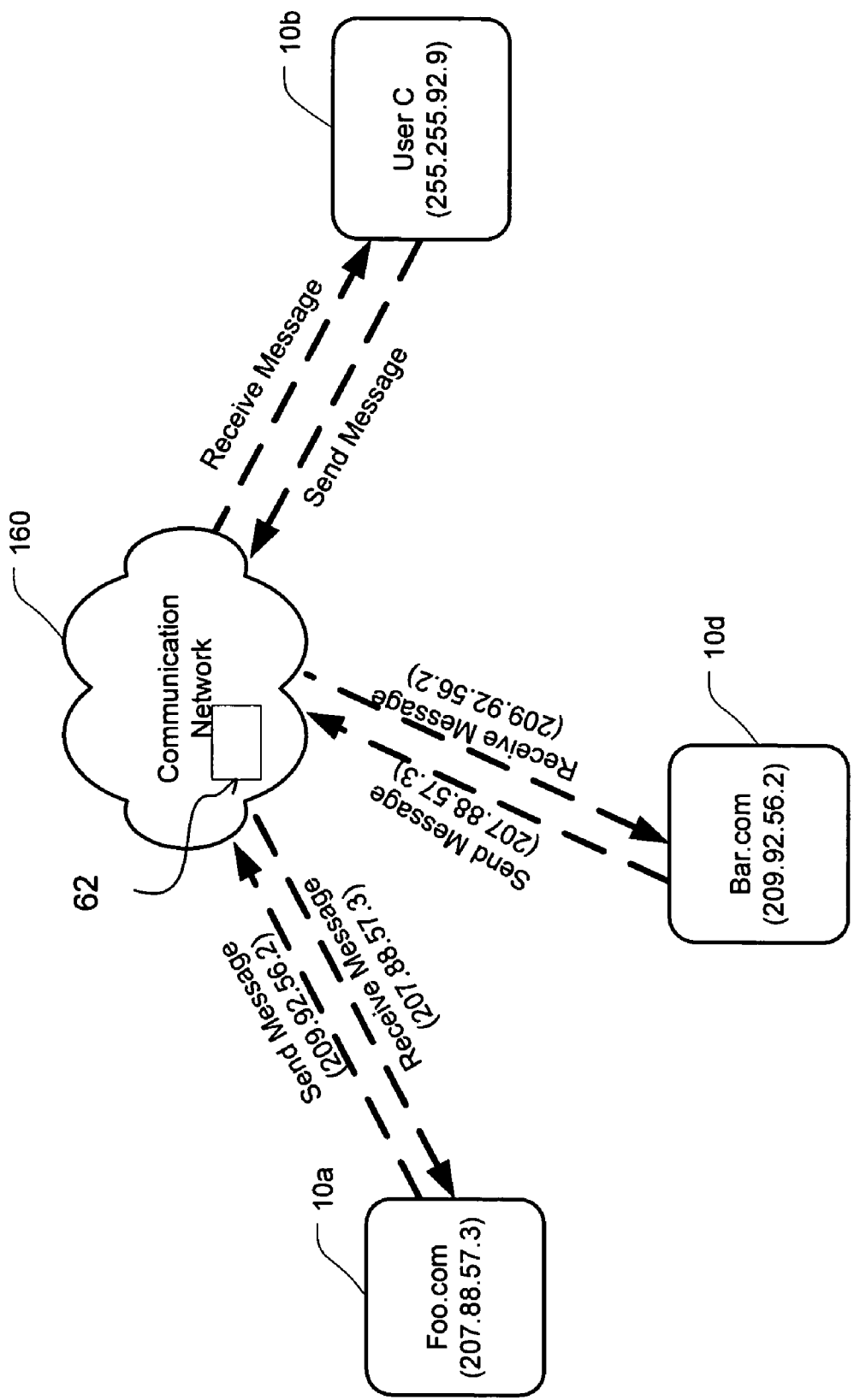
FIG. 2 is an illustration a communication sequence among computing devices on the Internet.

FIG. 2 further illustrates communication among computing devices by way of communication network 160. In this instance, computing device Foo.com desires communication with Bar.com. In a conventional communication, Foo.com may have some means of translating the named address "Bar.com" to its IP address (i.e. 209.92.56.2). Of course, foo.com and bar.com are used here for convenience. They will in practice be referred to according to their IP addresses. Additionally, Foo.com may want to communicate directly with Bar.com by using its IP address. In fact, some computing devices that act as clients may not have a "name" address because they are not providing services to the outside world that requires communication by way of a domain name. Instead, such systems initiate the communication and provide their IP addresses as part of the handshaking with the system with which they are communicating. In the case of Internet propagation systems, wherein the object is to communicate with each computing device connected to a given network, the domain name is of less significance.

Foo.com may want to determine if the address 209.92.56.2 is active on communications network 160. To that end, Foo.com sends a message to 209.92.56.2 that is routed by communications network 160 to Bar.com with an indication that the message is originating from computing device 10*a* at address 207.88.57.3. Bar.com then sends a reply to 207.88.57.3. As a result, Foo.com can determine that the IP address 209.92.56.2 is active and connected to communications network 160. Whereupon, Foo.com sends a package 62 to IP address 209.92.56.2 for consumption by Bar.com.

If Foo.com desired to find all of the active IP addresses on communications network 160, it would have to repeat the above communication exchange for the entire address space of communications network 160 (which would be $2^{32}$ in the case that communications network 160 represented the entire Internet). In the simplified example of FIG. 2, after finding an active computing device 10*d* at address 209.92.56.2, Foo.com would not find another active connection until finding computing device 10*b* at address 255.255.92.9.

As noted above, one technique that Foo.com could employ is scanning through all of the address between computing device 10*d* and computing device 10*b*. However, in that case, devices within communications network 160 or other observers of the communication activities on communication network 160 would recognize that Foo.com was methodically scanning through the network IP addresses.

Figure 3A:
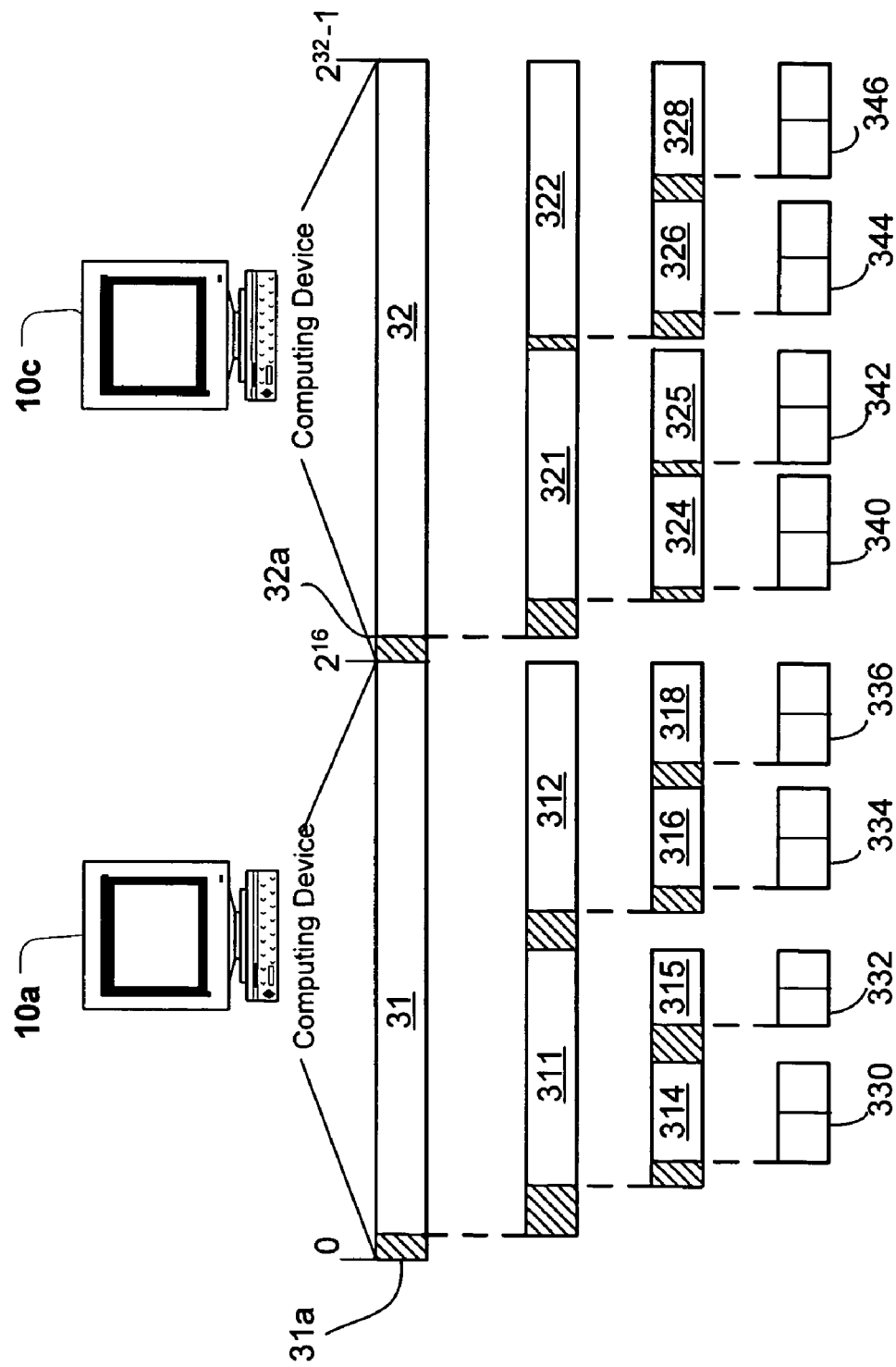

To further illustrate aspects of the invention, FIG. 3A illustrates a scanning technique whereby software may be propagated through a network using a technique akin to propagating an Internet worm. Here, the Internet address space is divided into two portions. For example, the first portion 31 ranges from 0 to $2^{15}$. The second portion 32 ranges from $2^{16}$ to $2^{32}-1$. Of course, any other suitable division could be used. Each range is preferably assigned to a separate computing device, e.g., portion 31 is assigned to computing device 10*a* and portion 32 is assigned to computing device 10*c*. Of course, the initial address space could be further subdivided to any number of computing devices to start the process. However, if the goal is to propagate over the entire Internet space, a handful of additional computing devices will not substantially accelerate the propagation.

Each computing device 10*a*, 10*c*, then begins scanning through the range of addresses within its portion 31, 32, respectively, in the manner briefly described with respect to FIG. 2. To that end, computing device 10*a* scans its assigned portion 31 attempting to find two computing devices to which it can deliver a payload (e.g. payload 62 in FIG. 2). In this example, computing device 10*a* scans portion 31*a* (shown with cross hatching) before finding and delivering a payload (e.g., payload 62) to two computing devices. Thereafter, the payload having been delivered, the newly enlisted computing devices execute the payload. As part of the operation of the payload, the newly enlisted computing devices each repeat the process of attempting to find two computing devices to which they can in turn deliver a copy of the payload, e.g., payload 62.

It would be undesirable for the newly enlisted computing devices to re-scan the portion of the address space that has been previously scanned, e.g., portion 31*a*. Hence, computing device 10*a* divides the remaining portion of its assigned address space. That is, the unscanned portion of 31 is divided into address spaces 311 and 312. Each of address spaces 311 and 312 are assigned to the two newly enlisted computing devices (not shown).

The above-described process of scanning, finding computing devices, dividing address space, and delivering payload is somewhat simultaneously being performed by computing device 10*c*. Hence, computing device 10*c* scans through portion 32*a* of its assigned address space 32 before enlisting two additional computing devices whose IP address falls within address space 32. Those newly enlisted computing devices are assigned address spaces 321 and 322, respectively and they in turn repeat the process for their assigned address spaces.

Completing the example, a computing device assigned portion 311, finds two additional computing devices with IP addresses within address space 311 and delivers a copy of the payload to each computing device and assigns address spaces 314 and 315, respectively, to the computing devices. Those computing devices each find two computing devices and re-divide their address spaces, so that address space 314 is divided into the address spaces as indicated at 330 and address space 315 is divided into address spaces as indicated at 332. Similarly, address space 312 becomes address spaces 316 and 318. Each of address spaces 316 and 318 in turn becomes become address spaces as indicated at 334 and 336.

This process of finding two computing devices, providing them with the payload and subdividing the address space is also being performed on address space 32 as it splits into address spaces 321 and 322 and splits again into address spaces 324 and 325 and address spaces 326 and 328. Address spaces 324, 325, 326, and 328 again split into address spaces 340, 342, 344, and 346. At each split, the previously scanned portions (e.g. 31*a* and 32*a*) do not need to be rescanned and are typically excluded from the portion that is subdivided among the newly enlisted computing devices.

The result of the above scanning technique is that after a very few divisions, a payload can be propagated through a very large portion of an IP address space. However, the above described process follows a predictable pattern. That is, significant portions of the address space are scanned sequentially from a computing device having a single IP address. For example, computing device 10*a* scans sequentially through all of the addresses in section 31*a* before passing its duties on to other computing devices. During that time, it is apparent to an outside observer (e.g., a device monitoring the activity on the network) that a repetitious, sequential probing of the network is taking place.

FIG. 3B illustrates the effect of scanning on an exemplary firewall or routing device 35. Here, computing device 10*a* begins scanning at address 0.0.0.1 and scans sequentially to 0.0.0.7. In a real world example, the scanning may go on for hundreds if not thousands of sequential IP addresses. In that instance, the firewall or router would be able to determine that computing device 10*a* is sending an inordinate number of sequential requests and take appropriate action.

Figure 4:
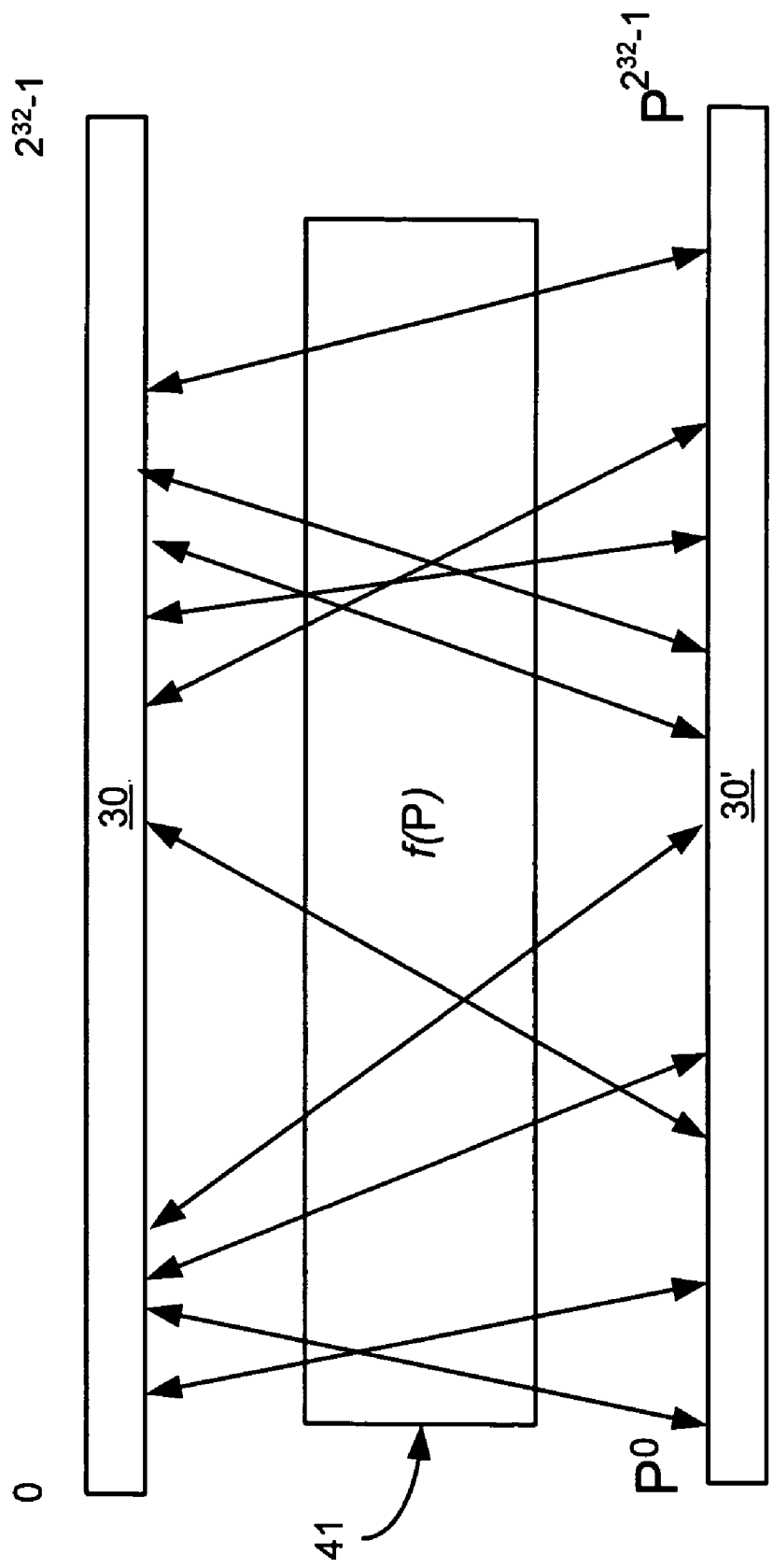
FIG. 4 illustrates a function that maps an IP address space to a pseudo random IP address space.

FIG. 4 illustrates a further aspect of the present invention. As shown, a function $f(P)$ 41 is provided that maps the IP address space 30 to address space 30'. The characteristics of function $f(P)$ 41 are such that it provides a one-to-one mapping from address space 30 to address space 30'. Moreover, for every address in address space 30', there is a corresponding address in address space 30 and vice versa. Hence, function $f(P)$ 41 essentially shuffles the addresses in address space 30 into address space 30'. One such function that can be used to perform this transformation makes use of a primitive element (see generator in [Neal Koblitz, "A Course in Number Theory and Cryptography", Second Edition, Graduate Texts in Mathematics, Springer, 1994]) to index IP addresses. The result is to randomly map an IP address i in address space 30 to an element e in address space 30' using a primitive element p.

Pseudo-randomness is achieved by traversing through the IP range as powers of a primitive element. Additional true randomness is achieved by the randomness of which computers are exploitable (the splitting of IP ranges is completely dependent dependant on this).

Exponential propagation is achieved by splitting the work load in half at each step. The Internet has $2^{32}$ addresses. The algorithm scans every computing device on the Internet in 32 steps.

One-to-One mapping is achieved by the definition of a primitive element. As a result, every host on the Internet with a valid IP is scanned once and only once.

Recall that an IP address of the form a.b.c.d (where a, b, c, d are integers between 0 and 255) is simply a 32 bit number; which are elements of $Z_p n=Z_2 32$. The algorithm starts with the selection of an appropriate primitive element, p. There are a number of know techniques for selecting a primitive element. In general, a function f(x) is a primitive polynomial if and only if the field element x generates the cyclic group of non-zero field elements of the finite field GF(p") where p is prime and $n \geq 2$. In particular, as a generator of the non-zero field elements, f(x) satisfies the equations:

$$x^{p^n-1} = 1 (\mod(f(x), p)$$

but $$x^m \neq 1 (\mod(f(x), p) \text{ for } 1 \leq m \leq p^n - 2$$

Figure 5A:
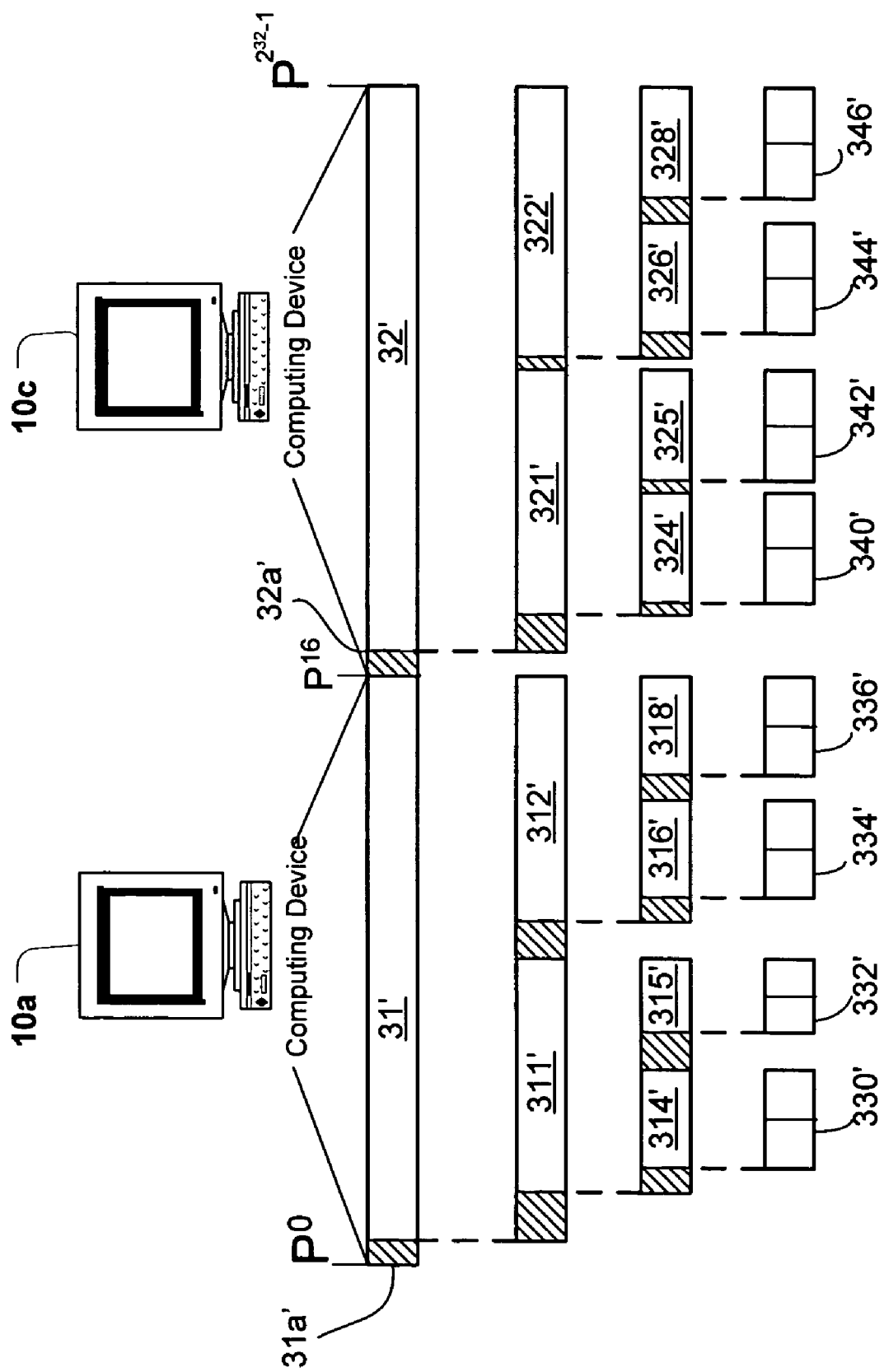
FIGS. 5A and 5B illustrate an example information propagation using the IP space mapped in accordance with a function as indicated in FIG. 4.

This method also works when p is an prime integer and the degree is equal to 1, using an prime integer less than p as the primitive element. After selecting a primitive element p, the algorithm proceeds by calling the propagation algorithm. Note that the initial call to the algorithm specifies the starting IP address, the lower and upper bounds of the network address space, and a primitive element. For example, to cover the entire Internet address space the call would be as follows:
 call propagation_alg (0, 2^32-1, p);

The propagation algorithm works as follows:
 Choose primitive element (generator) p in the address space
 Set LowerBound
 Set UpperBound
 Propagation_alg (LowerBound, UpperBound, p)
  for i from LowerBound to UpperBound/2
   if IsExploitable (p^i modulo the size of the address space)//If an expoitable network address is found then
    send and ExecuteOrRemotelyCall propagation_alg (i+1, UpperBound/2, p);
    exit for
  for i from UpperBound/2+1 to UpperBound
   if IsExploitable (p^i modulo the size of the address space
   then
    send and ExecuteOrRemotelyCall propagation_alg (i+1, UpperBound, p);
    exit for
 ExecuteOrRemotelyCall//Whatever code was sent as the payload would be executed
 IsExploitable//checks if target is a possible candidate to split the workload After applying the above algorithm to the IP address space, FIG. 5A illustrates a technique whereby software may be propagated through a network using a technique akin to propagating an Internet worm. Here, the Internet address space is divided into two portions. For example, the first portion 31' ranges from $P^0$ to $P^{2^{15}}$; that set of addresses was produced by setting Lowerbound to 0 and Upperbound to $2^{15}$ in the above algorithm. The second portion 32' ranges from $P^{2^{16}}$ to $P^{2^{32}-1}$ and results from setting Lowerbound to $2^{16}$ and Upperbound to $2^{32}-1$ in the above algorithm. Of course, any other suitable division could be used. Each range is preferably assigned to a separate computing device, e.g., portion 31' is assigned to computing device 10a and portion 32' is assigned to computing device 10c. Of course, the initial address space could be further subdivided to any number of computing devices to start the process. However, if the goal is to propagate over the entire Internet space, a handful of additional computing devices will not substantially accelerate the propagation. The use of the binary tree is O(log(n)), where n is the size of the space, complete and would linearly improve by addition of child nodes.

Each computing device 10a, 10c, then begins traversing through the range of addresses within its portion 31', 32', respectively, in the manner briefly described with respect to FIG. 2. To that end, computing device 10a traverses its assigned portion 31' attempting to find two computing devices to which it can deliver a payload (e.g., payload 62 in FIG. 2). Notably, unlike the scanning associated with FIGS. 3A and 3B, this technique will cause requests to various computing devices to appear random in time and sequence.

Figure 5B:
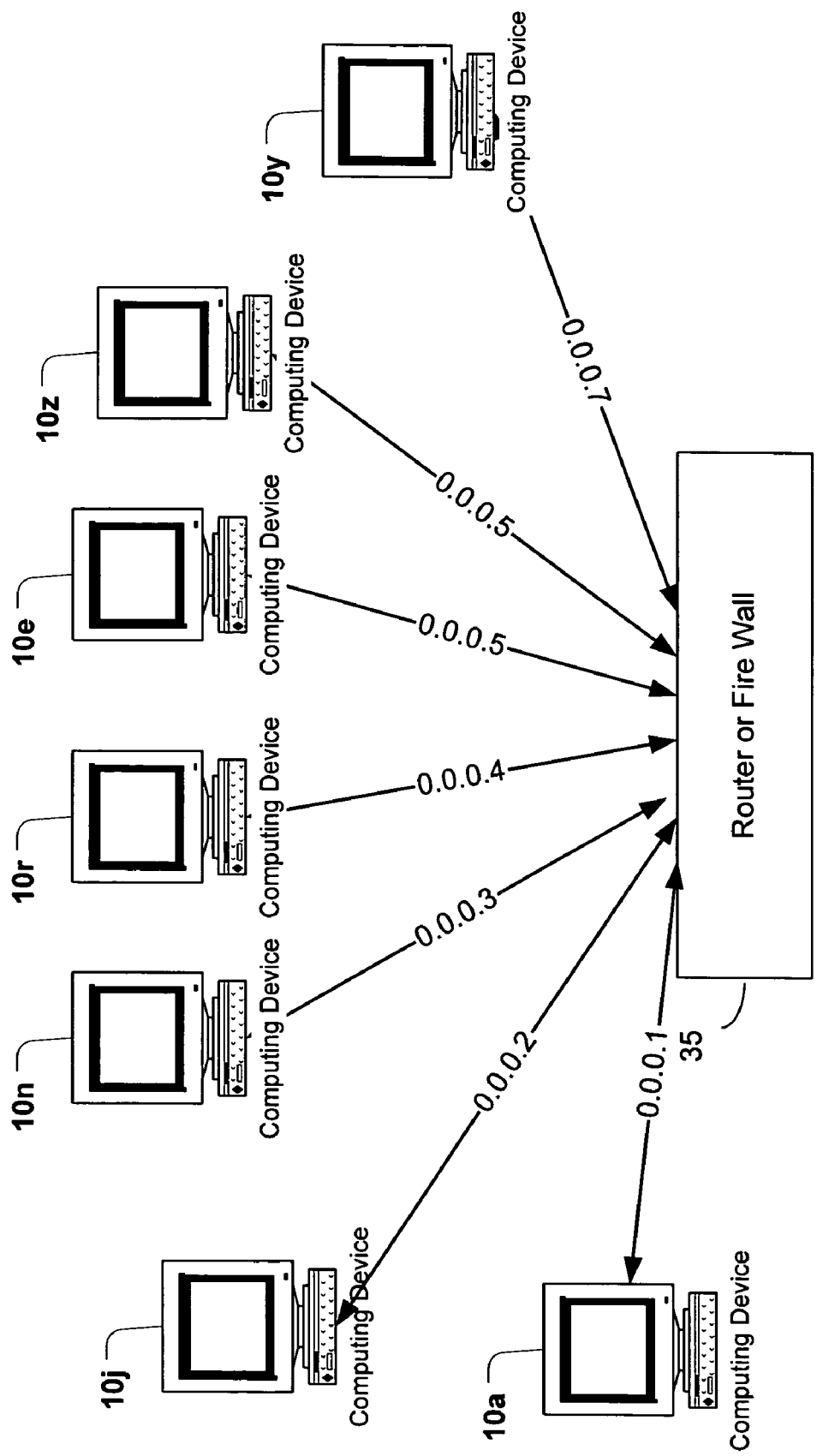

FIG. 5B for example, illustrates this feature. Rather than a sequence of IP addresses hitting firewall or routing device 35 in sequential time from the same computing device 10a, now the IP address requests come from a variety of computing devices 10a, 10j, 10n, 10r, 10e, 10z, and 10y and may come at a completely random time. Hence, a single router or firewall will have more difficulty determining that the requests are associated with the same attempt to deliver payload 62.

One application of the above propagation technique would be to provide a patch or software update to software systems on a network including the Internet or a subnet. In that instance, the randomness of the propagation would relieve the traffic on any one portion of a large network. That is, a large software update that went through a single network point in sequential fashion would tend to overwhelm and slow that portion of the network. Hence, a seemingly random process would tend to spread the load across the entire network.

Additionally, the above propagation technique could be built into a security program to simulate seemingly random worm attacks. Such a system may provide security administrators with analyses of emerging threats to help provide advanced warning and targeted countermeasures.

Another application of the above technique is to distribute a distributed computing application to a plurality of computing devices coupled to a network. Such a system could harness the vast resources of a computing network to address a computing problem that requires significant processing power but that can be performed in parallel by a plurality of computing devices.

Figure 6:
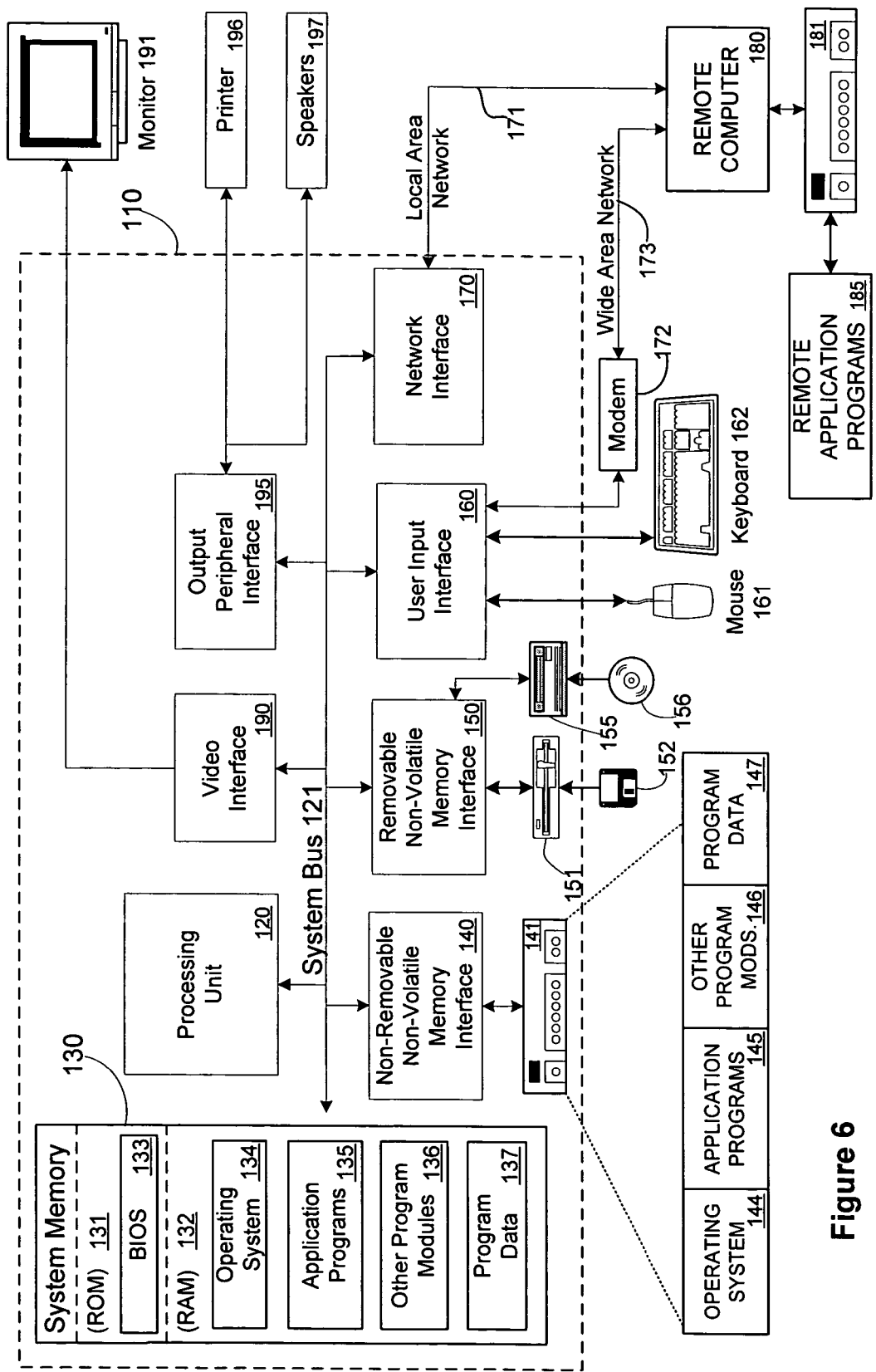
FIG. 6 is a block diagram of an exemplary computing environment in which aspects of the invention may be implemented.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for propagating data over a network, the method comprising:
   determining a sequential first set of network addresses;
   mapping a range of addresses in the sequential first set of network addresses to a second set of addresses wherein the second set of addresses is a one to one mapping of the range of addresses in the first set and wherein the addresses in the second set are not in increasing address order, wherein the mapping comprises a function based on a primitive element selected using a primitive polynomial;
   traversing a plurality of addresses in the second set of addresses to find another element of the network;
   dividing a set of non-traversed addresses in the second set of addresses into a plurality of subsets of addresses, each subset of addresses comprising a respective range of addresses in the second set of addresses, wherein addresses in the second set of addresses that have been traversed are excluded from the dividing step and are excluded from the subsets of addresses; and
   transferring the data to the another element of the network along with an indication of at least one of the subsets of addresses.

2. The method as recited in claim 1, further comprising traversing the second set of addresses to find a second element of the computer network and transferring the data to the second element of the computer network and an indication of at least a second portion of the addresses remaining in the second set that have not been traversed.

3. The method as recited in claim 1 wherein the indication of the at least a portion of the addresses remaining comprises a function used to perform that mapping.

4. The method as recited in claim 1 wherein the network comprises Internet Protocol addresses.

5. The method as recited in claim 4 wherein the network is coupled to the Internet.

6. The method as recited in claim 4 wherein the network comprises a subnet.

7. The method as recited in claim 1 wherein the element of the computer network comprises a computing device.

8. The method as recited in claim 1 wherein the network comprises Internet Protocol addresses.

9. A system for propagating data over a network, the system comprising:
   a processor;
   a memory device in communication with the processor and storing a sequential first set of network addresses;
   a set of computer readable instructions stored on the memory device for carrying out a mapping of a range of addresses in the sequential first set of network addresses to a second set of addresses wherein the second set of addresses is a one to one mapping of the range of addresses in the first set and wherein the addresses in the second set are not in increasing address order, wherein the mapping comprises a function based on a primitive element selected using a primitive polynomial;
   a set of computer readable instructions stored on the memory device for carrying out a traversing of a plurality of addresses in the second set of addresses to find another element of the network;
   a set of computer readable instructions stored on the memory device for carrying out a dividing of a set of non-traversed addresses in the second set of addresses into a plurality of subsets of addresses each subset of addresses comprising a respective range of addresses in the second set of addresses wherein addresses in the second set of addresses that have been traversed are excluded from the dividing of the set of non-traversed addresses and are excluded from the subsets of addresses; and
   a set of computer readable instructions stored on the memory device for carrying out a retransferring of the data to the another element of the network along with an indication of at least one of the subsets of addresses.

10. The system as recited in claim 9 comprising a set of computer readable instructions in communication with the memory device for carrying out a traversing of the second set of addresses to find a second element of the computer network and transferring the data to the second element of the computer network and an indication of at least a second portion of the addresses remaining in the second set that have not been traversed.

11. The system as recited in claim 9 wherein the indication of the at least a portion of the addresses remaining comprises a function used to perform that mapping.

12. The system as recited in claim 9 wherein the network comprises Internet Protocol addresses.

13. The system as recited in claim 12 wherein the network is coupled to the Internet.

14. The system as recited in claim 12 wherein the network comprises a subnet.

15. The system as recited in claim 9 wherein the element of the computer network comprises a computing device.

16. A computer-readable storage medium bearing computer readable instructions for propagating data over a network, the instructions comprising:

instructions for determining a sequential first set of network addresses;

instructions for mapping a range of addresses in the sequential first set of network address to a second set of addresses wherein the second set of addresses is a one to one mapping of the range of addresses in the first set and wherein the addresses in the second set are not in increasing address order, wherein the mapping comprises a function based on a primitive element selected using a primitive polynomial;

instructions for traversing a plurality of addresses in the second set of addresses to find another element of the network;

instructions for dividing a set of non-traversed addresses in the second set of addresses into a plurality of subsets of addresses, each subset of addresses comprising a respective range of addresses in the second set of addresses wherein addresses in the second set of addresses that have been traversed are excluded from the division of the set of non-traversed addresses and are excluded from the subsets of addresses; and instructions for transferring the data to the another element of the network along with an indication of at least one of the subsets of addresses.

17. The computer-readable medium storage as recited in claim 16 comprising instructions for traversing the second set of addresses to find a second element of the computer network and transferring the data to the second element of the computer network and an indication of at least a second portion of the addresses remaining in the second set that have not been traversed.

18. The computer-readable storage medium as recited in claim 16 wherein the indication of the at least a portion of the addresses remaining comprises a function used to perform that mapping.

19. The computer-readable storage medium as recited in claim 16 wherein the network comprises Internet Protocol addresses.

20. The computer-readable storage medium as recited in claim 19 wherein the network is coupled to the Internet.

21. The computer-readable storage medium as recited in claim 19 wherein the network comprises a subnet.

22. The computer-readable storage medium as recited in claim 16 wherein the element of the computer network comprises a computing device.

23. A method for distributed computing propagation, the method comprising:

(a) determining a sequential first set of network addresses;

(b) mapping a range of addresses in the sequential first set of network addresses to a second set of addresses wherein the second set of addresses is a one to one pseudo-random mapping of the range of addresses in the first set and wherein the addresses in the second set are not in increasing address order, wherein the mapping is a function based on powers of a primitive element selected using a primitive polynomial;

(c) traversing a plurality of addresses in the second set of addresses to locate at least two other elements of the network;

(d) subdividing the addresses of the second set of addresses that were not traversed in act (c) into a plurality of portions, wherein addresses of the second set of addresses that were traversed in act (c) are excluded from the portions;

(e) transferring a set of computer readable instructions to the at least two other elements of the network to carry out a distributed computing function; and (f) transferring an indication of each portion of the addresses remaining in the second set by specifying a range of addresses in the each portion along with a set of computer-readable instructions for carrying out acts (a) through (e) to a respective element of the at least two other elements.

24. The method as recited in claim 23 wherein the indication of the at least a portion of the addresses remaining comprises a function used to perform that mapping.

25. The method as recited in claim 23 wherein the network is coupled to the Internet.

26. The method as recited in claim 23 wherein the network comprises a subnet.

27. The method as recited in claim 23 wherein the element of the computer network comprises a computing device.

* * * * *